United States Patent
Bowler et al.

(10) Patent No.: US 12,028,202 B2
(45) Date of Patent: Jul. 2, 2024

(54) OUT OF BAND FREQUENCY CONVERSION USING DEMODULATION

(71) Applicant: ARRIS Enterprises LLC, Suwanee, GA (US)

(72) Inventors: David Bowler, Stow, MA (US); Michael R. Morisseau, Lowell, MA (US); Clarke V. Greene, Middletown, CT (US); Bruce C. Pratt, Bedford, NH (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/976,455

(22) Filed: Oct. 28, 2022

(65) Prior Publication Data
US 2023/0140220 A1 May 4, 2023

Related U.S. Application Data

(60) Provisional application No. 63/272,992, filed on Oct. 28, 2021.

(51) Int. Cl.
*H04L 27/38* (2006.01)
*H04H 20/78* (2008.01)

(52) U.S. Cl.
CPC ............ *H04L 27/38* (2013.01); *H04H 20/78* (2013.01)

(58) Field of Classification Search
CPC ....... H04L 27/38; H04N 21/643; H04N 5/455
USPC ......................................... 375/261
See application file for complete search history.

(56) References Cited

U.S. PATENT DOCUMENTS

2016/0295251 A1* 10/2016 Cloonan .............. H04N 21/615

* cited by examiner

*Primary Examiner* — Leila Malek
(74) *Attorney, Agent, or Firm* — Chernoff, Vilhauer, McClung & Stenzel, LLP

(57) ABSTRACT

A system that includes a downstream device that receives an analog out-of-band signal received in a downstream frequency spectrum of the downstream device including control channel data for a consumer premise equipment. At the downstream device converting the analog out-of-band signal to a digital signal including the control channel data. At the downstream device converting the digital control channel data out-of-band signal to an analog signal including the control channel data at an out-of-band signal for the consumer premise equipment, where the converted analog out-of-band signal for the consumer premise equipment is at a frequency included in an upstream frequency spectrum of the downstream device.

6 Claims, 4 Drawing Sheets

OUT OF BAND FREQUENCY CONVERSION USING DEMODULATION

CROSS REFERENCE TO RELATED APPLICATIONS

This application claims the benefit of U.S. Provisional Patent Application Ser. No. 63/272,992 filed Oct. 28, 2021.

BACKGROUND

The subject matter of this application relates to out of band control for legacy set top boxes.

Modern CATV delivery systems provide to their customers not only the broadcast television content (video plane) historically associated with cable delivery networks, but also data services (data plane) such as Internet services, certain video-on-demand, and other data communications either desired or necessary for providing customer services. The evolution of the architectures to deliver these respective video plane and data plane services has traditionally been disconnected, since traditional radio frequency (RF) combiner networks in a headend allowed video and data streams to have a fair degree of independence during delivery of both video and data. The CATV delivery systems provide channel mappings for broadcast video services to customer premise equipment, such as various forms of set top boxes. As the CATV delivery systems have evolved, including distributed and non-distributed architectures, different bands of frequencies are used for upstream and downstream traffic, which results in managing the desired channel mapping and other control functionality for broadcast video services across a variety of different customer premise equipment to be problematic.

What is desired, therefore, is an efficient manner of managing the channel mapping and other control functionality for QAM based video services.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

One exemplary type of cable television system is a distributed access architecture (DAA). Distributed access architectures may include Remote-Physical (R-PHY) architectures that relocate physical (PHY) devices downstream into the network while retaining the control layer (MAC) layer in the headend, as well as R-MACPHY architectures that relocate both the PHY and MAC layers downstream into the network and R-OLT architectures that relocate optical line terminals (OLT) in passive optical networks (PON) to a remote location, as well as many other variations. An R-PHY architecture, which remotely locates a physical device (PHY) that converts optical digital signals to radio frequency (RF) signals such as a quadrature amplitude modulated (QAM) signal, will be used to describe the embodiments disclosed in this specification, but those of ordinary skill in the art will appreciate that the disclosures herein may be employed with other DAA architectures and/or remote devices. Further, the embodiments disclosed herein in this specification are likewise applicable to non-DAA architectures.

Figure 1:
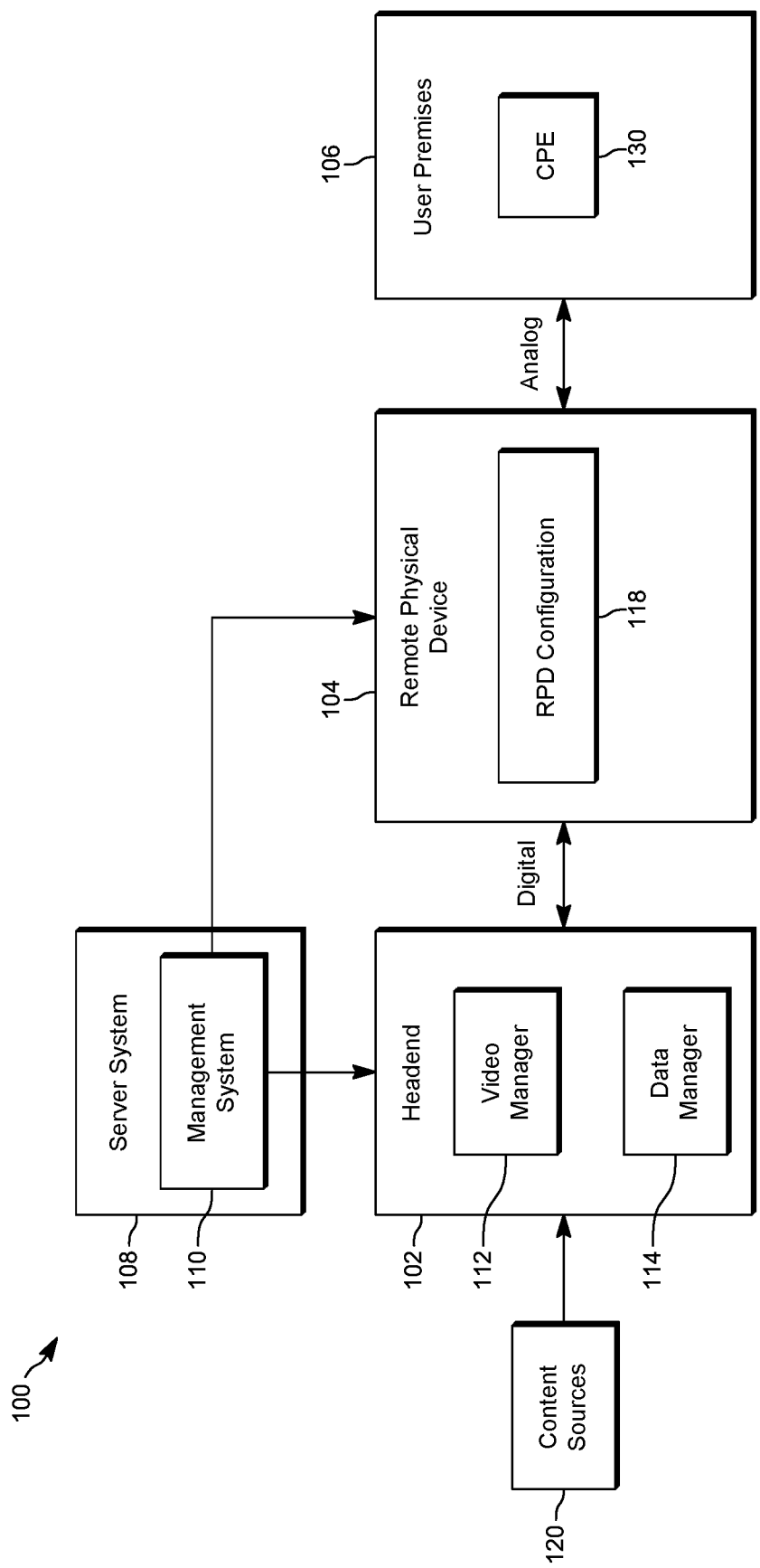
FIG. 1 illustrates an exemplary system for delivering data and video in a distributed architecture.

FIG. 1 depicts a simplified system 100, simply for purposes of illustration, capable of being used to implement a technique for delivering data and video according to some embodiments. The system 100 includes a headend 102, a remote physical device 104, user premises 106, and a server system 108. The system 100 may be a distributed access architecture as discussed above where digital optical components are used to replace analog optical components between the headend 102 and the remote physical device 104, which allows the physical components to perform the analog to digital (and RF) conversion and to be configured deeper in the network, closer to the user premises 106. The headend 102 may deliver video and data to user premises 106 using the remote physical device 104. Although a single user premises 106 and a single remote physical device 104 are shown, the remote physical device 104 may be coupled to multiple user premises 106. Additionally, the system 100 may include multiple remote physical devices 104 that are coupled to different sets of user premises 106. It is noted that traditional non-DAA analog distribution system may continue to coexist with the DAA illustrated. It is noted that traditional non-DAA architectures may likewise be used, as desired.

The headend 102 may receive video and data from content sources 120. A video manager 112 may manage the video delivery to the user premises 106 and a data manager 114 may manage the data delivery to the user premises 106. In some embodiments, the headend 102 may deliver both video and data to the user premises 106 via the same frequency spectrum. For example, the RF frequency spectrum may include an upstream frequency range and a downstream frequency range. The downstream frequency range may deliver both video and data downstream from the headend 102 to the user premises 106 at different frequencies. Similarly, the upstream frequency range delivers video and data upstream from the user premises 106 to the headend 102. The headend 102 may send the video and data signal via a digital network, such as via an optical signal. The remote physical device 104 may receive the digital signal and convert the signal to analog, such as to an RF signal. In the upstream direction, the remote physical device 104 receives analog video or data signaling from the user premises 106, converts the analog video or data signaling to a digital signal, and sends the digital signal to the headend 102.

The video manager 112 may use an RPD configuration 118 to insert video and data into a digital signal that is sent to the remote physical device 104. The remote physical device 104 then converts the video into analog at the corresponding frequencies and sends the analog signal to the user premises 106.

The RPD configuration 118 may be a list of addresses that pertain to video delivery. For example, the addresses may be multicast addresses for video streams. The video manager 112 uses information that is associated with video streams received at the headend 102 to determine which video to insert into the digital signal that is sent to the remote physical device 104. For example, the headend 102 receives various video streams based on a legacy video delivery through a legacy video network (e.g., a network that creates video streams and performs the QAM RF conversion at the headend 102). The video manager 112 inserts the appropriate video into the digital signal with information about the desired frequency placement for the specific RPD configuration 118 and provides the video to the specific remote physical device 104.

The server system 108 includes a management system 110 that can define the suitable configuration for the video delivery for the headend 102. The management system 110 may also define the suitable configuration of the RPD configuration 118 for the video delivery for the remote physical device 104.

As it may be observed the user premises 106 may include consumer premises equipment (CPE) 130 in the form of cable modems and/or set top boxes and/or television with decrypting card (or otherwise) at the user premises 106. Such consumer premises equipment are distributed across cable systems ranging from thousands of devices to hundreds of thousands of devices to tens of millions of devices to receive and render broadcast video services. In some cases, such consumer premises equipment may be one way receiving devices that are not capable of transmitting data or otherwise to the network. In other cases, such consumer premises equipment may further be capable of transmitting data or otherwise to the network. In yet other cases, such consumer premises equipment may be capable of receiving other types of video streams, such as those suitable for linear broadcasts, conditional access, video on demand, switched digital video, and/or advertisement insertion.

The headend 102 in combination with the remote physical device 104 (if included in the network topology) are often capable of providing (1) video stream distributions where one or more of the video streams are constructed based on selections by the viewer, in a manner together with, (2) the broadcast of more traditional video streams, such as legacy networks (e.g., ABC, CBS, NBC, CNN, PBS, etc.) where the video streams are not constructed based on selections by the viewer. Both video streams are provided by the headend 102 to the remote physical device 104 and to the user premises as an analog signal on a coaxial cable. Accordingly, the video stream is provided by the headend 102 to the user premises 106 and the CPEs 130. When the viewer selects a channel in a traditional broadcast video stream the consumer premises equipment tunes to the selected channel of the traditional broadcast video stream. In this manner, the headend 102 is capable of providing traditional broadcast video streams to the consumer premises equipment that are not capable of making particular requests. In the event that the consumer premises equipment is capable to making requests to the headend 102 for particular video streams, the requested video stream may be provided to the consumer premises equipment through a coordination of video stream placement and consumer premises equipment tuning by a system, such as a switched digital video system.

The DOCSIS protocol is often used to send digital video and data between the headend and the customer premise equipment (e.g., cable modem and/or set top box). For many customer premise equipment, a control channel consists of an out-of-band (OOB) carrier located at or near 75 MHz in the downstream spectrum The out-of-band (OOB) carrier may be located at frequencies, such as in the range of 70 MHz to 130 MHz. The control channel includes various data for providing control information to the customer premise equipment, such as channel maps, program guides, and code images. As users send more data upstream, it is desirable for cable system operators to increase the upstream capacity.

Figure 2:
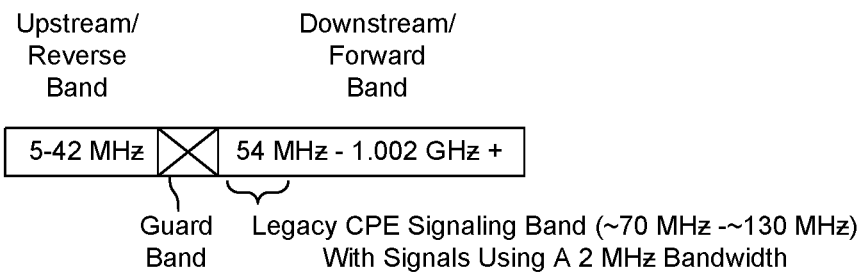
FIG. 2 illustrates a frequency spectrum for a legacy cable network.

Referring to FIG. 2, the traditional RF spectrum 200 for use with the DOCSIS protocol has a 5-42 MHz upstream band in the United States and a 5-65 MHz band in Europe, a guard band, and a downstream band. The downstream band is 54 MHz on the low side to 550 MHz, 750 MHz, 862 MHz, 1002 MHz, or greater on the high side. As previously mentioned, legacy customer premise equipment are programmed via an out of band (OOB) 2 MHz control channel in the 70-130 MHz region of the forward band. In some cases, the OOB control channel ranges from 2-6 MHz channel bandwidth, which may include three 2 MHz control channels. The OOB control frequency is normally set to 75+−1 MHz which is at a gap between legacy analog television channels four and five.

Figure 3:
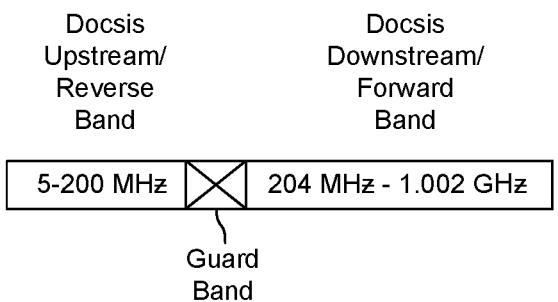
FIG. 3 illustrates a frequency spectrum for a high split cable network.

Referring to FIG. 3, a high split RF spectrum 300 for use with the DOCSIS protocol, or otherwise, extends the DOCSIS upstream bandwidth. The high split RF spectrum 300 extends the upstream from 5-42 MHz to 5-200 MHz (or similar frequency) and modifies the downstream spectrum from 54 MHz to 204 MHz as the lower frequency (or similar frequency).

The high split of the RF spectrum includes a substantial drawback when used together with legacy consumer premise equipment, since the high split eliminates the 70-130 MHz legacy downstream OOB control channel used by legacy consumer premise equipment. Accordingly, in order to make use of the high split which allocates additional upstream bandwidth all of the existing legacy consumer premise equipment would need to be replaced. Rather than having to replace all existing legacy consumer premise equipment, in order to support the OOB control channel, it is desirable to devise other techniques for providing the out of band signaling to the legacy customer premise equipment with the high split network.

Figure 4:
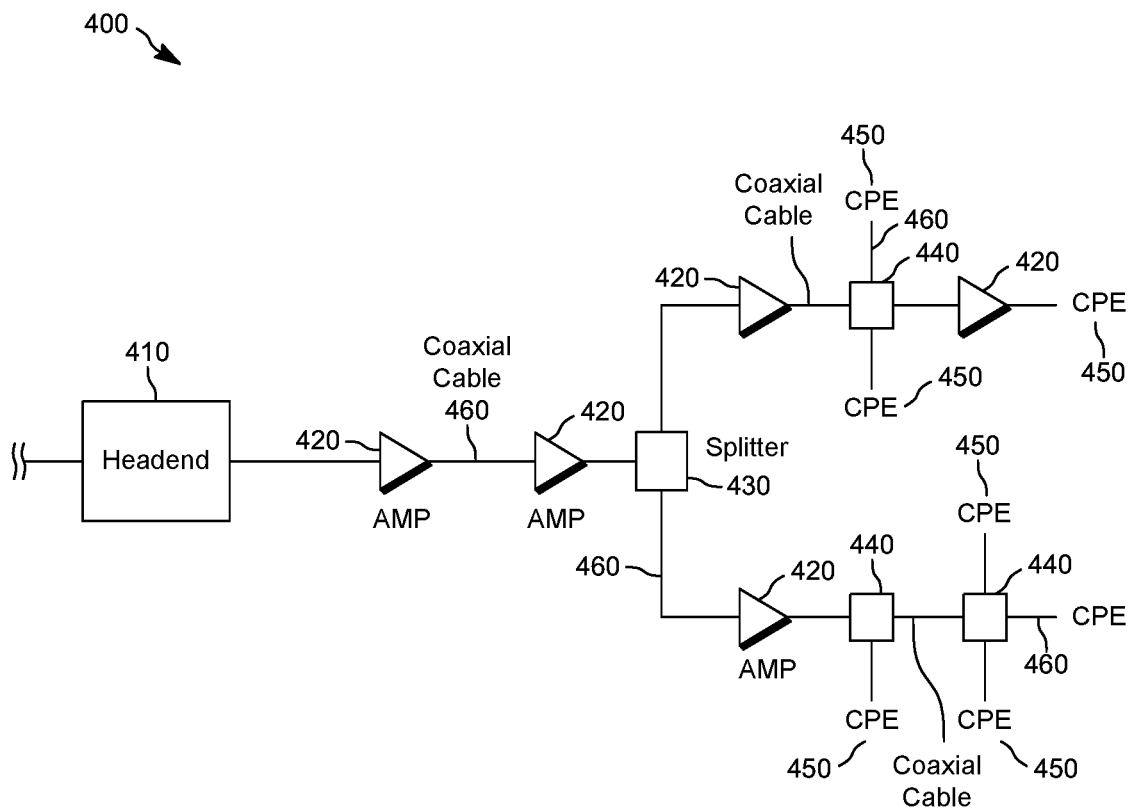
FIG. 4 illustrates a cable network with amplifiers, splitter(s), taps, and consumer premise equipment.

Referring to FIG. 4, a simplified cable network 400 is illustrated. The network 400 includes a set of components that are arranged at various positions within the network depending on the particular topology. A headend 410 sends data to the network and receives data from the network. The network includes one or more amplifiers 420, one or more splitters 430, one or more taps 440, etc., to provide data to and receive data from customer premise equipment 450. The components are interconnected together by coaxial cables 460. In many networks, optical fibers are also used between the headend 410 and an optical node in the network.

Figure 5:
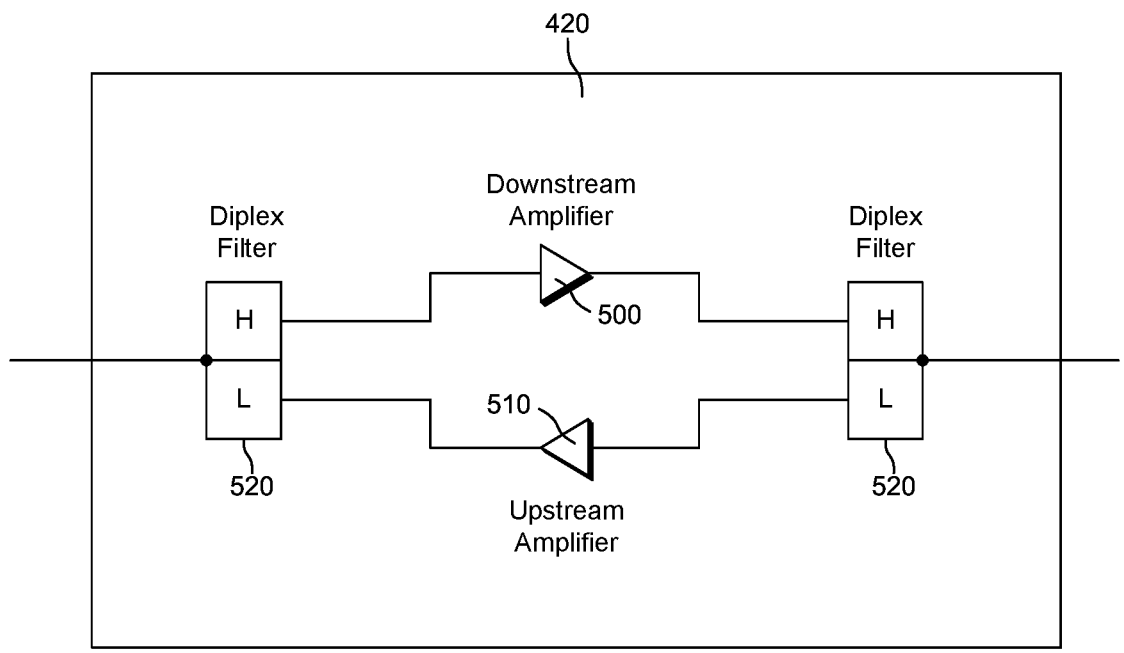
FIG. 5 illustrates an amplifier.

Referring also to FIG. 5, each of the amplifiers 420 are preferably a two-way amplifier that includes a downstream amplifier circuitry 500 and upstream amplifier circuitry 510. The inputs to the amplifier also preferably include respective diplex filters (high and low) 520. In this manner, the downstream data is filtered by the diplex filters 520 and amplified by the downstream amplifier 500. In this manner, the upstream data is filtered by the diplex filters 520 and amplified by the upstream amplifier 510. The range of the downstream amplifier 500, in combination with the diplex filters 520, are preferably selected to correspond to the range of frequencies for the high split architecture, such as for example, 204 MHz to 1.2 GHz. The range of the upstream amplifier 510 in combination with the diplex filters 520, are preferably selected to correspond to the range of frequencies for the high split architecture, such as for example, 5 MHz to 200 MHz. Other frequency ranges may likewise be used, as desired.

The downstream amplifier could be modified to further include the capability of amplifying and passing through the out of band frequency (e.g., 75 MHz) together with the downstream frequency range (e.g., 204 MHz to 1.2 GHz). The downstream diplex filters could be modified to further include the capability of passing through the out of band frequency (e.g., 75 MHz) together with the downstream frequency range (e.g., 204 MHz to 1.2 GHz). In this manner, the OOB frequency carrying the control channel data can be passed through the amplifier to the customer premise equipment. However, the passing of a narrow band of frequencies together with the broad range of frequencies tends to result in substantially increased complexity together with added complexities associated with signal integrity associated with the narrow passband.

The upstream amplifier could be modified to further include the capability of blocking the out of band frequency (e.g., 75 MHz) within the upstream frequency range (e.g., 5 MHz to 200 MHz). Also, the diplex filters could be modified to further include the capability of blocking the out of band frequency (e.g., 75 MHz) within the upstream frequency range (e.g., 5 MHz to 200 MHz). In this manner, the OOB frequency carrying the control channel data can be prevented from passing through the amplifier in the upstream direction. However, the blocking of a narrow band of frequencies within the broad range of frequencies tends to result in substantially increased complexity together with added complexities associated with signal integrity associated with the narrow blocked band. Also, the blocking of the OOB frequency in the upstream path is likely necessary to prevent the upstream OOB frequency from being subsequently amplified in the downstream path.

Unfortunately, such an amplifier modification including diplex filters requires switching out of a multitude of amplifiers within the network, with the added expense and disruption to customers. In a similar manner, the splitters 430 may need to be modified to accommodate the providing the OOB frequency in the downstream path while rejecting the OOB frequency in the upstream path. In a similar manner, the taps 440 may need to be modified to accommodate the providing the OOB frequency in the downstream path while rejecting the OOB frequency in the upstream path. Unfortunately, such modifications to the splitters and/or the taps, in addition to other components in the network, results in further expense and disruption to the customers.

Another technique may include a frequency conversion technique to transmit an OOB signal downstream and then shift it to a legacy consumer premise equipment (e.g., 70 MHz to 130 MHz) using a mixer. However, this requires multiple filters to isolate the carrier channel and to prevent mixing artifacts/images from degrading the down converted signal. Because the filters are fixed, the carrier frequency and the output frequency are likewise fixed, and not changeable. Also, the modulation error ratio of the upconverted OOB signal will degrade as it propagates downstream. Furthermore, the basic frequency conversion approach fails to provide for automatic or manual level control for the final OOB signal. Although variations in the downstream amplifier gain and cable loss due to temperature may be compensated by a Bode equalizer, once the OOB carrier is separated from the downstream spectrum, there is no more correction. The OOB signal also passes through several temperature sensitive elements (e.g., gain modules, steep filters, mixers, and directional couplers) all without temperature compensation. To some extent, the node generating the OOB carrier may compensate for this, but any corrections will be global changes in the carrier level, while in general the variations that need to be corrected are local to each amplifier.

Rather than using an analog frequency conversion technique to modify the OOB signal, it is desirable to use an analog to digital to analog conversion technique, which introduces what would otherwise be an unnecessary set of conversions.

Figure 6:
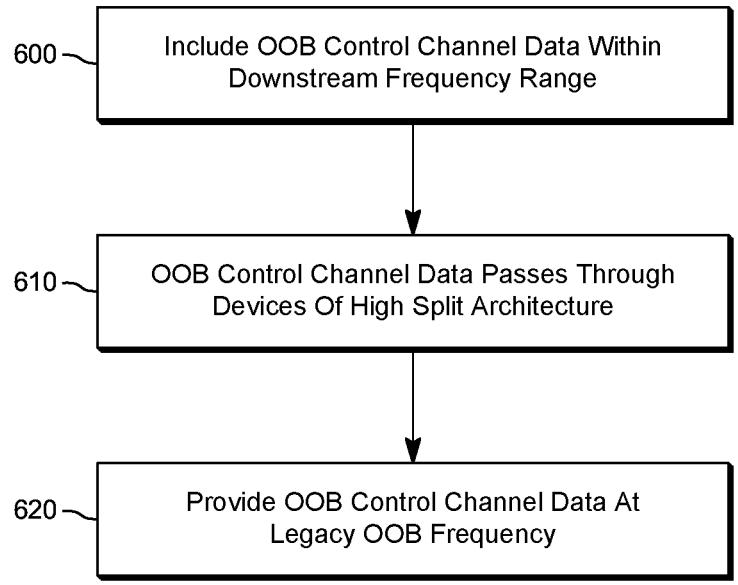
FIG. 6 illustrates receiving and transmitting OOB signals.

Referring to FIG. 6, the OOB control channel data may be included in a carrier frequency or channel within the downstream frequency range 600. With the OOB control channel data included within the downstream frequency range 600, the OOB control channel data may pass through the existing high split architectures 610, inclusive of the amplifiers, the splitters, and the taps. This may be achieved in any suitable manner, such as frequency conversion of an existing OOB signal, direct generation of the same signal but in the downstream frequency range, or by including the OOB control channel data in a downstream DOCSIS channel. The legacy consumer premise equipment still expect to receive the OOB control channel data at a predefined frequency, such as within the 70-130 MHz range. It was determined that the OOB control channel data could be provided to the consumer premise equipment if it was included in the frequency range in a manner that could be received by the legacy consumer premise equipment 620.

Figure 7:
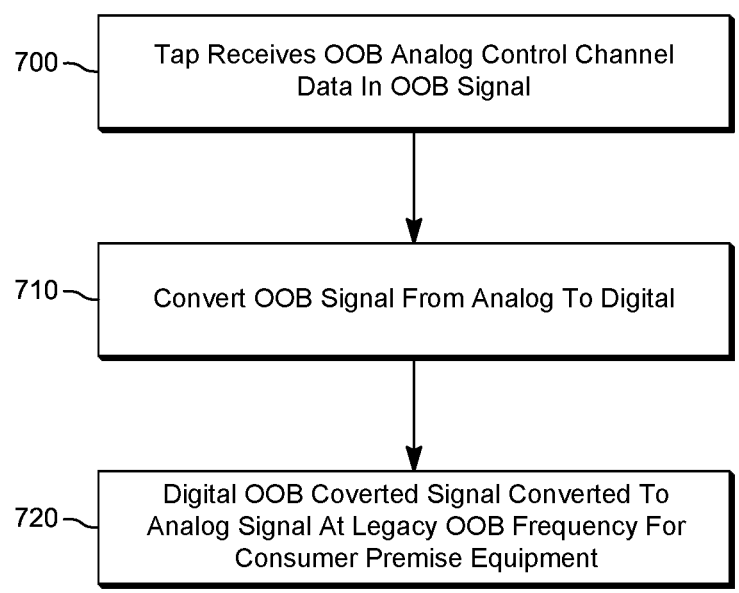
FIG. 7 illustrates providing OOB signals to legacy consumer premise equipment.

Referring to FIG. 7, to provide such OOB control channel data to the consumer premise equipment, a tap (or other device) 700 associated with one or more customer premise devices receives the OOB control channel data in the downstream frequency range. The received OOB control channel data is at a frequency range above that which the legacy consumer premise equipment uses to receive such OOB control channel data. The tap (or other device) 700 converts the OOB carrier signal and/or channel to from an analog signal a digital format 710. Because of the digital nature of the OOB channel data, the entire signal may be reconstructed with the modulation error ratio restored given a sufficient initial modulation error ratio. The digital converted OOB control channel data 710 is then modulated to an analog signal at the desired frequency for the customer premise equipment 720, such as 75 MHz. For example, the resulting OOB control channel data may be a 2 MHz QPSK signal within the 70 to 130 MHz range, which is in the OOB frequency of the consumer premise equipment. The modified analog OOB signal is provided to the legacy consumer premise equipment.

For example, the OOB channel data may be wrapped in a full 6 MHz DOCSIS channel. The use of the DOCSIS channel enables further inclusion of additional control of the OOB signal path. For example, the additional control may include automatic level control on an amp by amp basis. The customer premise equipment in a particular service group report their received OOB level back to the node. The node then packages this information with the OOB control data in the carrier channel. When the carrier is demodulated, this information may be extracted and used to control the output level of the QPSK modulator, to optimize the received level in that amp's service group.

The analog to digital to analog technique has several advantages. One advantage is the reduction in degradation of OOB control data over a downstream cascade as long as the carrier channel's modulation error ratio is sufficient, the OOB control data can be completely recovered and modulated onto a consumer premise device frequency carrier at each amplifier location.

Another advantage may include significant easing of filter requirements. A cable modem chipset may be used to pick off the carrier channel without a steep (or any) bandpass filter or exclusion zone.

Another advantage may include frequency agility of the carrier channel. Because of the lack of a band pass filter, the carrier channel is free to move to other downstream frequencies. This eases channel planning considerations and allows a smooth transition to even higher split systems without hardware reconfiguration of the OOB module.

Another advantage may include a means by which amp-by-amp automatic level control of the customer premise equipment may be achieved. When the signal is remodulated onto a customer premise equipment frequency carrier, the modulator outputs at each amplifier will be at equal power levels. This is as opposed to the basic frequency conversion approach, where the net downstream gains/losses seen by the OOB carrier can vary. Alternatively, if a full DOCSIS channel is used for the OOB carrier, some of the extra 4 MHz in the channel may be used for control functionality, such as the desired output level and customer premise equipment frequency. This allows automatic level control of the OOB on an amp by amp basis.

Another advantage may include elimination of image frequencies and mixing artifacts as a result of the demodulation and remodulation.

Another advantage may include when an amp-by-amp injection scheme is used, notch filters may be employed to limit the residual OOB signal at the upstream inputs of the amplifiers/node. This limits customer premise equipment frequency agility, but some small amount (a few MHz) can be accommodated as long as the OOB stays within the confines of the notch filter. With the basic mixer approach, this would be done by slightly varying the downstream carrier frequency. However, because the LO's of each mixer are fixed and equal, the final OOB frequencies will still be equal at each amplifier. With this approach, because each amplifier's customer premise equipment OOB frequency can be independently set, the OOB frequency maty be varied on a span by span basis. This reduces the problem of self-interference of the customer premise equipment OOB. By alternating between two slightly offset (~2.5 MHz) frequency signals at each amplifier location, the residual OOB signal from a span that makes it through the notch filter at the next amplifier no longer interferes with that amplifier's OOB. Normally, there would be some concern about the band-edges of the notch filter and whether both tones would fit and align properly.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method comprising:
   (a) at a downstream device, receiving an input analog out-of-band signal from a head-end through a hybrid-fiber-coaxial network received within a downstream frequency spectrum by the downstream device, where said downstream frequency spectrum includes at least some frequencies between 204 MHz and 1.002 GHz and does not include any frequencies between 5 MHz and 130 MHz, where the input analog out-of-band signal includes control channel data suitable for a consumer premise equipment included within at least one frequency between 204 MHz and 1.002 GHz;
   (b) at the downstream device, converting the input analog out-of-band signal to a converted digital signal by an analog to digital converter, where the converted digital signal includes the control channel data; and
   (c) at the downstream device, converting the converted digital signal that includes the control channel data to an output analog out-of-band signal that includes the control channel data for the consumer premise equipment by a digital to analog converter where the output analog out-of-band signal is within the range of 70 MHz to 130 MHz, where the downstream device provides data at frequencies that includes said at least some frequencies between 204 MHz and 1.002 GHz and the output analog out-of-band signal is within the range of 70 MHz to 130 MHz, where the output analog out-of-band signal for the consumer premise equipment is at a frequency included in an upstream frequency spectrum of the downstream device between said downstream device and said head-end through said hybrid-fiber-coaxial network;
   (d) wherein the output analog out-of-band signal that includes the control channel data for the consumer premise equipment by the digital to analog converter has an adjustable power level that is automatically adjusted by the downstream device to match a power level of data at frequencies that includes the at least some frequencies between 204 MHz and 1.002 GHz.

2. The method of claim 1 wherein the analog out-of-band signal received in the downstream frequency spectrum comprises a frequency that is above a guard band for a cable television system downstream communications band.

3. The method of claim 1 wherein the output analog out-of-band signal for the consumer premise equipment is at a frequency that is below a guard band for a cable television system upstream communications band.

4. The method of claim 1 wherein the analog out-of-band signal received by the downstream device being in a range greater than 200 MHz.

5. The method of claim 4 wherein the output analog out-of-band signal being in a range of 74 MHz to 76 MHz.

6. The method of claim 5 wherein the output analog out-of-band signal is a QPSK signal.

* * * * *